US007484146B2

(12) United States Patent
Olgaard et al.

(10) Patent No.: US 7,484,146 B2

(45) Date of Patent: Jan. 27, 2009

(54) METHOD FOR CAPTURING MULTIPLE DATA PACKETS IN A DATA SIGNAL FOR ANALYSIS

(75) Inventors: Christian Olgaard, Sunnyvale, CA (US); Dirk Johannes Marius Walvis, Santa Cruz, CA (US)

(73) Assignee: LitePoint Corp., Sunnyvale, CA (US)

( * ) Notice: Subject to any disclaimer, the term of this patent is extended or adjusted under 35 U.S.C. 154(b) by 350 days.

(21) Appl. No.: 11/422,475

(22) Filed: Jun. 6, 2006

(65) Prior Publication Data

US 2007/0294378 A1 Dec. 20, 2007

(51) Int. Cl.
*G01R 31/28* (2006.01)

(52) U.S. Cl. ....................... 714/724; 714/731; 714/742; 370/389; 370/394; 370/474

(58) Field of Classification Search ....................... None
See application file for complete search history.

(56) References Cited

U.S. PATENT DOCUMENTS 6,229,808 B1 * 5/2001 Teich et al. ................. 370/398
6,442,163 B1 * 8/2002 Chopping ................ 370/395.1
6,480,489 B1 * 11/2002 Muller et al. ............... 370/389
6,714,985 B1 * 3/2004 Malagrino et al. .......... 709/236
6,779,050 B2 * 8/2004 Horton et al. ................ 710/30
6,781,992 B1 * 8/2004 Rana et al. .................. 370/394
6,785,239 B1 * 8/2004 Tasker ........................ 370/238
6,950,442 B2 * 9/2005 Chai et al. .................. 370/470
6,963,572 B1 * 11/2005 Carr et al. ................... 370/401
2002/0031125 A1 3/2002 Sato et al.
2004/0133733 A1 * 7/2004 Bean et al. .................. 711/100
2005/0243743 A1 * 11/2005 Kimura ...................... 370/278
2005/0281232 A1 * 12/2005 Kim et al. ................... 370/335
2006/0106946 A1 * 5/2006 Agarwal et al. ............. 709/250
2007/0071034 A1 * 3/2007 Fleming ..................... 370/474

OTHER PUBLICATIONS

International Search Report for PCT/US07/67853, dated Jun. 6, 2008, 3 pages.
Written Opinion for PCT/US07/67853, dated Jun. 6, 2008, 4 pages.
U.S. Appl. No. 60/596,444, filed Sep. 23, 2005, Method for Simultaneous Testing of Multiple Orthogonal Frequency Division Multiplexed Transmitters with Single Vector Signal Analyzer.

* cited by examiner

*Primary Examiner*—John P Trimmings
(74) *Attorney, Agent, or Firm*—Vedder Price P.C.

(57) ABSTRACT

A method for selectively capturing selected portions of multiple data packets within a packet data signal for analysis by capturing only desired or necessary portions of the data packets and assembling them into substantially contiguous data streams prior to transferring them for analysis.

18 Claims, 4 Drawing Sheets

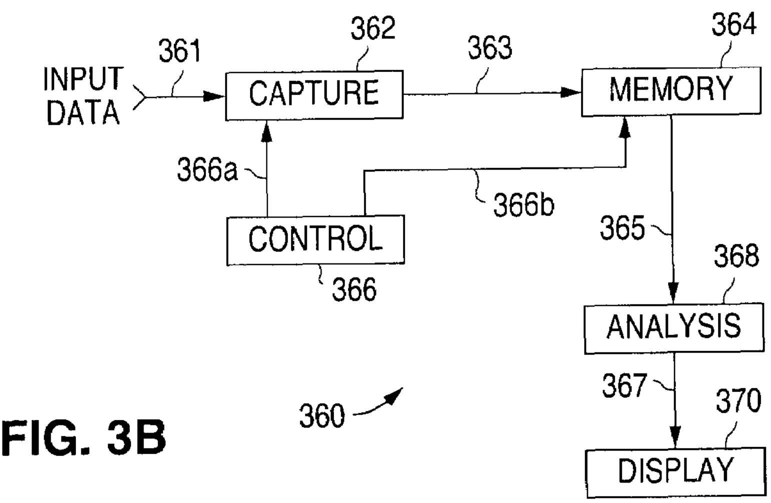
FIG. 3B
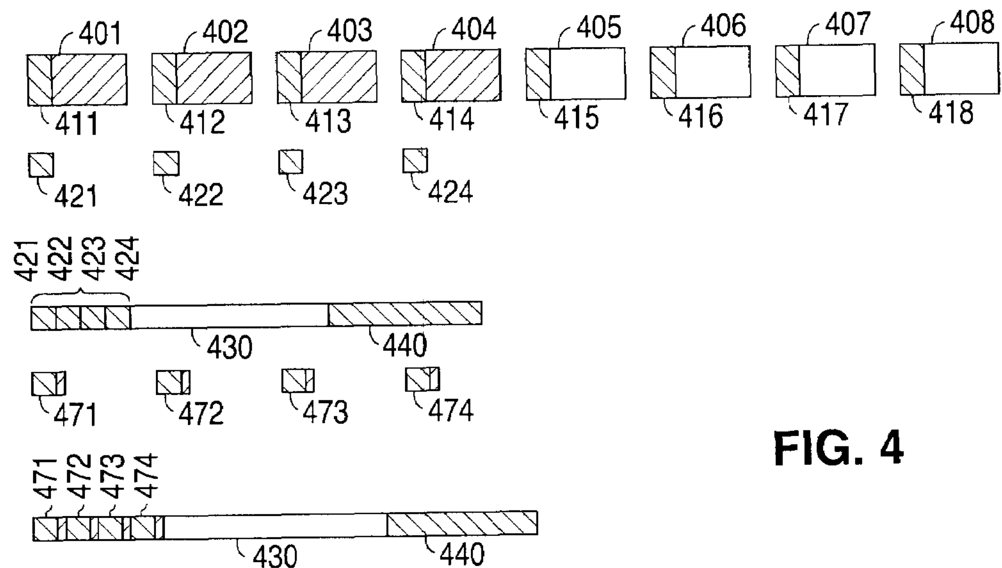
FIG. 4
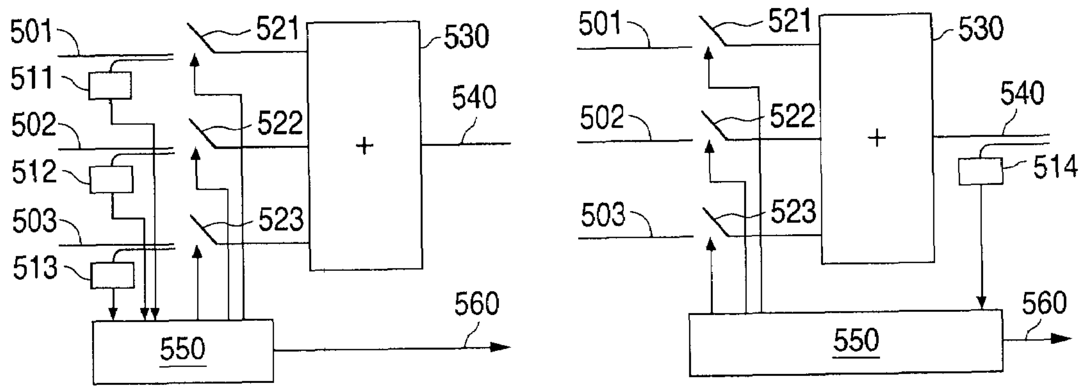
FIG. 5A
FIG. 5B

METHOD FOR CAPTURING MULTIPLE DATA PACKETS IN A DATA SIGNAL FOR ANALYSIS

BACKGROUND OF THE INVENTION

1. Field of the Invention

The present invention relates to methods for capturing data packets within a digital data signal, and in particular, to methods for capturing data packets within a digital data signal by capturing predetermined portions of the data signal to allow for simpler and more efficient data analysis.

2. Related Art

Increasingly, many well-known and popular data communications systems communicate via digital data signals in which the data is distributed among a number of data packets which are transmitted sequentially and then reassembled within the receiver, often following transmission along various distinct signal paths (e.g., as is done with the Internet). Conventional test equipment for measuring these data signals capture these data packets, store them and then transfer them for analysis. Often, the transfer and analysis of the captured data takes longer than the process by which they are captured from within the data signal, in part because of the need to transfer the captured data to remote analysis circuitry (e.g., a computer separate from the test equipment). Consecutive data packets are often closely spaced, particularly within data signals being transmitted at high data rates. Accordingly, conventional test equipment will often not measure consecutive packets, but instead will capture non-adjacent packets spaced in time by an interval approximating the time needed for analysis or measurement.

However, it is often desirable to capture consecutive packets, e.g., to analyze power variations from one packet to another. To do this with conventional test equipment, it would generally be necessary to increase the time interval available for capturing the data packets, thereby causing the capture window to become equal to the duration of the number of consecutive data packets sought to be captured and analyzed. This, however, is disadvantageous due to the fact that increasing the capture window will also slow down the overall data capture and analysis operation, since more data will need to be transferred between the capture memory and analysis engine. Further, in many communication systems, the data packets are not closely spaced, which means that much of the captured data is unused since it corresponds to the gaps between consecutive data packets.

Also, in multiple-input, multiple-out (MIMO) systems with a single data analysis engine, such as is often done in a production test environment, time efficiency in capturing and analyzing data packets becomes even more important. As is well know, a MIMO system uses multiple transmitters operated in parallel. Testing one transmitter at a time requires that the overall system be maintained in a transmit state of operation longer, and thereby potentially affect its performance due to increased heat buildup. To effectively avoid this would require testing one transmitter, powering the unit down, waiting for it to stabilize in its off state, and then power the unit up again to test the next transmitter, and so on. As a result, overall test time would increase significantly.

SUMMARY OF THE INVENTION

In accordance with the presently claimed invention, a method is provided for selectively capturing selected portions of multiple data packets within a packet data signal for analysis by capturing only desired or necessary portions of the data packets and assembling them into substantially contiguous data streams prior to transferring them for analysis.

In accordance with one embodiment of the presently claimed invention, a method for selectively capturing at least respective portions of multiple data packets within a packet data signal for analysis includes:

receiving a packet data signal including a plurality of sequential non-contiguous data packets;

capturing a respective portion, at least, of each one of a portion of the plurality of sequential non-contiguous data packets to provide a plurality of captured data;

assembling the plurality of captured data to provide a plurality of substantially contiguous data; and conveying the plurality of substantially contiguous data for processing.

In accordance with another embodiment of the presently claimed invention, a method for selectively capturing at least respective portions of multiple data packets within a packet data signal for analysis includes:

receiving, during a first time interval, a packet data signal including a plurality of sequential data packets separated by respective time intervals;

capturing, during a second time interval, a respective portion, at least, of each one of a portion of the plurality of sequential data packets to provide a plurality of captured data;

assembling, during a third time interval which is shorter than the second time interval, the plurality of captured data to provide a plurality of substantially contiguous data; and conveying, during a fourth time interval, the plurality of substantially contiguous data for processing.

BRIEF DESCRIPTION OF THE DRAWINGS

FIG. 3B is a functional block diagram of a test system in which a method in accordance with the presently claimed invention can be practiced.

FIG. 4 is a diagram depicting a method of capturing data packets for analysis in accordance with another embodiment of the presently claimed invention.

FIGS. 5A and 5B are functional block diagrams of signal switching circuits for capturing data packets for analysis in accordance with additional embodiments of the presently claimed invention.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
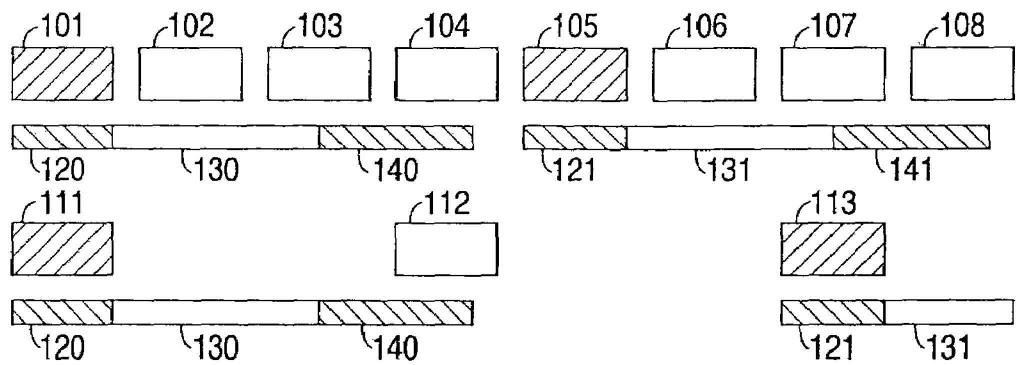
FIG. 1 is a diagram depicting a conventional method of capturing and analyzing data packets.

Referring to FIG. 1, conventional test equipment typically triggers on a signal and captures data packets following such triggering event. After the data has been captured and stored in memory, it is generally transferred to a separate analysis circuit either within the test equipment or to remote analysis circuitry, e.g., a personal computer for analysis and display of the results. For example, for a series of data packets 101-108 received from the signal source, i.e., the device under test (DUT), the duration of the capture interval 120 is typically substantially equal to the duration of a single data packet. The captured data packet is transferred during internal 130 to the analysis portion of the test equipment where it is analyzed during interval 140, and possibly displayed. While it may be possible that the system is available for further data capture following the transfer interval 130, generally some data validity testing is required before further data capture can begin, as represented by interval 140. In any event, even if this further delay 140 is not necessary, the next data capture interval 121 cannot begin until completion of the analysis interval 140, thereby preventing the capturing of closely spaced consecutive data packets. Hence, it will only be possible to capture widely spaced, and often non-consecutive, data packets 101, 105 due to these necessary delays. If the data packets are more widely spaced, such as data packets 111, 112 and 113, fewer packets will be missed between those that are captured.

Further, the capture 120, transfer 130 and analysis 140 intervals are not necessarily shown to scale, and the data transfer interval 130 is often significantly longer than the duration of the data packet being captured. This is particularly true for systems having large bandwidths, e.g., where very high data sampling ratios are needed, thereby requiring a large amount of data to be collected when sampling even relatively short data packets. In such instances, for all data packets to be analyzed, the packets must be spaced widely in time, thereby causing the system to be operated for testing in a mode in which the DUT is not normally operated.

Further still, it is often desirable to capture consecutive data packets so as to analyze short term changes in the system operation. Accordingly, it is then necessary to increase the data capture interval. Additionally, it is often desirable in production test environments to use statistical analyses of the test data to determine the performance characteristics. Having consecutive data packets facilitates analyses of system variations, such as power control operation of a code division multiple access (CDMA) transmitter where signal power is often variable. Similar power control methods are used in other forms of wireless signal communication, and it is often desirable to know if the power being analyzed is at its maximum or minimum level before analyzing the captured data packets, since data transmission quality often depends upon the actual signal transmission power (e.g., signal compression in the transmitter often affects the quality of the transmitted signal).

Figure 2:
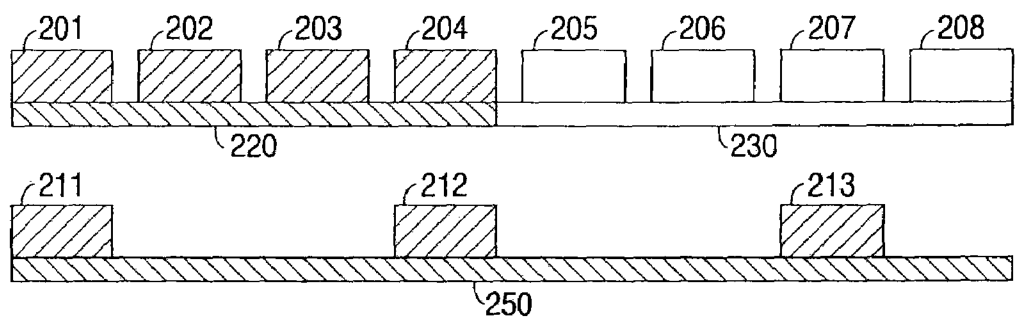
FIG. 2 is a diagram depicting another conventional method of capturing and analyzing data packets.

Referring to FIG. 2, a conventional system for capturing and analyzing consecutive data packets 201, 202, 203, 204 relies upon an increased data capture interval 220 to span the interval that includes the desired data packets. Accordingly, the amount of data captured will increase by an amount equal to the captured data packets plus the intervening time intervals, or gaps, by which the data packets are separated. As a result, the transfer interval 230 also increases significantly.

In those instances where the data packets 211, 212, 213 are more widely spaced, the data capture interval 250 increases by a correspondingly significant amount as well, as will the transfer interval (not shown), thereby significantly slowing the operation of the test equipment as well as increasing the required amount of data capture memory within and, therefore, the cost of, the test equipment.

Figure 3A:
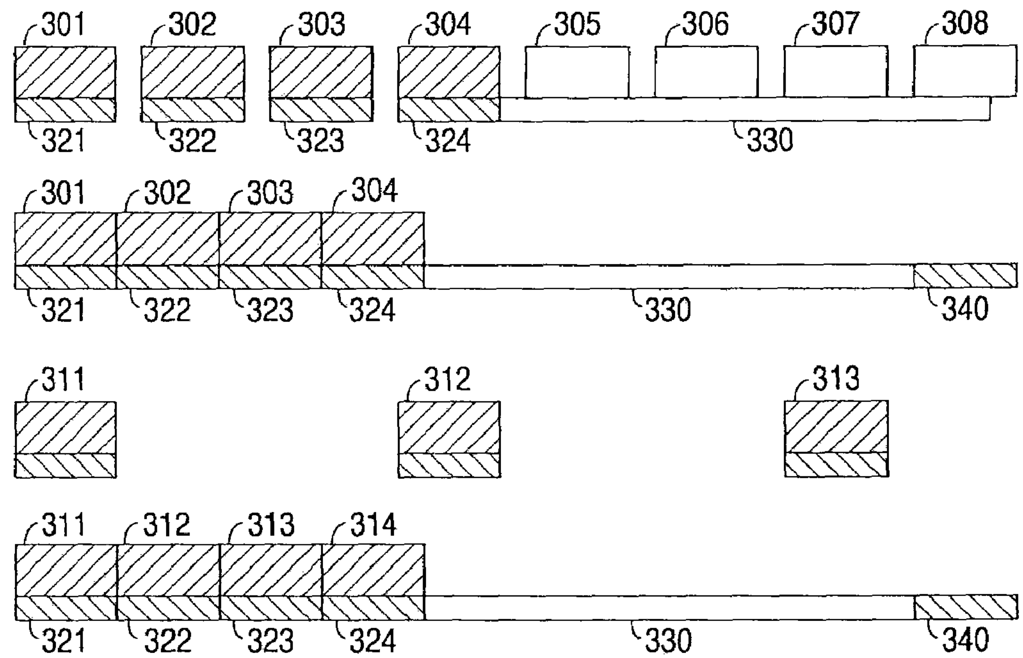
FIG. 3A is a diagram depicting a method of capturing data packets for analysis in accordance with one embodiment of the presently claimed invention.

Referring to FIG. 3A, in accordance with the presently claimed invention, a number of programmable trigger events are used for capturing the data packets, rather than using a single trigger for each data capture. For example, with closely spaced data packets 301-308 a trigger sequence can be programmed to capture four consecutive packets 301-304 during data capture intervals 321-324. The duration of each capture interval 321-324 is preferably equal to the duration of each corresponding data packet 301-304. This advantageously packs the four data packets together by avoiding the capturing of effectively null data associated with the time intervals between the actual data packets 301-304. Accordingly, the transfer time 330 for the captured data is reduced. This reduction in the captured data transfer time 330, relative to the overall time interval during which the incoming data packets arrive, improves significantly as the incoming data packets 311-313 are spaced further apart. In other words, for data packets 311-313 having durations equal to the corresponding closely spaced data packets 301-304, notwithstanding the longer durations of the time intervals between such data packets 311-313, the resulting data capture intervals 321-324 remain the same (this includes capture of an incoming data packet 314 not shown due to space limitations within the drawing), as does the data transfer interval 330. However, relative to the overall time needed for the incoming data packets 311-314 to arrive, the data transfer interval 330 is significantly reduced. In any event, regardless of whether the incoming data packets are closely spaced or widely spaced, the data transfer time can be optimized and remain independent of the time interval for the stream of incoming data packets.

Referring to FIG. 3B, one example of a system 360 for capturing data packets for analysis in accordance with the presently claimed invention includes data capture circuitry 362 (e.g., sample-and-hold circuitry and analog-to-digital signal conversion circuitry) for capturing the incoming data stream 361. The captured data 363 is stored in memory 364. Control circuitry 366 controls the capture circuitry 362 and memory 364 via control signals 366*a*, 366*b*. The captured data 365 is retrieved from the memory 364 and transferred to analysis circuitry 368 (e.g., a microprocessor and associated support circuitry) either locally within the test equipment or remotely in an external computer, all of which are well known in the art. The results 367 of the data analysis can then be made available for viewing on a display 370 by the user (not shown). In normal operation, data packets tend to be separated by longer time intervals than those typically used for production testing, since it is desirable to minimize time necessary for such testing. However, this can result in test results which are not truly indicative of circuit operation during normal use. One way to address this is to further reduce the data transfer 330 and data analysis 340 intervals (FIG. 3A) relative to the time interval needed for the arrival of the incoming data packets 301-304.

In many instances, it may not be necessary to capture each entire data packet. For example, in the IEEE 802.11a wireless data standard, it is specified that transmit quality is to be measured over a minimum of 16 data symbols. While data packets are generally longer than 16 symbols, it is only necessary to capture 16 symbols of each packet to perform the test according to the standard. Another option is to measure the power of orthogonal frequency division multiplex (OFDM) signals according to the standard. The RMS power can be measured by measuring the training symbol of the data packet (e.g., typically 8-16 microseconds into the packet), thereby requiring that only 16 microseconds of each data packet be captured for power measurement.

Referring to FIG. 4, this can be done by capturing selected portions 411-414 of the incoming data packets 401-404 during corresponding data capture intervals 421-424. By reducing the capture time in this way, the amount of captured data for the four consecutive data packets 421-424 will be reduced, particularly when this captured data is packed in a consecutive manner prior to the data transfer interval 430. Similarly, the data analysis interval 440 will also be reduced.

Alternatively, in addition to the captured data 421-424, small data separator packets 471-474 can be introduced following each corresponding portion of captured data. This can have the effect of simplifying subsequent analysis of the data, since the system may more easily identify the start or end of each portion 421-424 of captured data. The additional overhead data to be transferred, as a result of this, will depend upon the size of the data separator packets 471-474.

As a further alternative, as opposed to introducing data separator packets 421-424, the captured data can also be encoded with a marker signal, e.g., as the least significant bit of the captured data or in a separate data bit. This can reduce or even eliminate the additional overhead data otherwise introduced by the data separator packets 471-472.

Another advantage of using limited data capture times is related to the capture of multiple data packets. For example, when capturing multiple data packets, each data packet in the stream may be different. Capturing multiple data packets allows for the capture, in a single capture sequence, of one of each type of data packet used. This can advantageously reduce test time, since all results for a single frequency can be obtained in a single data capture sequence. Further, analysis of the captured data can be optimized by reducing the data for each packet to be equal to the longest required data capture. For example, transmission of multiple data packets may result in packets of different lengths being transmitted, as the drivers used to produce the packets may use a fixed data amount per packet, with the durations becoming longer with lower data rates. However, even if the duration does become longer, only the predetermined capture time need be used, e.g., the first 16 symbols for a system based upon the IEEE 802.11a OFDM standard. While the symbol rate remains constant, the modulation used for this symbol will change the data rate, as is commonly done to simplify implementations. Using a fixed capture time for each data packet can significantly improve analysis of multiple data packets.

In the discussion above, it has been assumed that the system triggers at the beginning of each data packet. However, it should be understood that a predetermined delay can be introduced in the trigger so as to initiate data capture at a later point in each data packet. For example, in a IEEE 802.11a OFDM signal, when seeking to capture data from eight to 16 microseconds within the data packet, a delay of eight microseconds can be introduced to delay the triggering of the data capture.

When testing the multiple transmitters of a MIMO system, it may be desirable to use multiple parallel receivers such that the data packets can be captured and analyzed in parallel. However, test equipment having parallel receivers can be cost prohibitive for purposes of production testing. One alternative to the need for parallel testing is to use a composite signal analysis as proposed in U.S. Provisional Patent Application No. 60/596,444, filed Sep.23, 2005, and entitled "Method for Simultaneous Testing of Multiple Orthogonal Frequency Division Multiplexed Transmitters with Single Vector Signal Analyzer", the disclosure of which is incorporated herein by reference. Such a composite analysis involves the combining of the multiple transmit signals into a single signal, e.g., via a signal power combiner, so that a single receiver can be used to analyze the composite signal.

Such a composite signal analysis technique requires some method by which the coupling between the transmitters can be identified or analyzed so as to determine the origin of the signal being analyzed. Additionally, it is important that the data within the packet being analyzed be known. While this is more easily done in a production test environment, it nonetheless requires special drivers for the transmitter.

In accordance with another embodiment of the presently claimed invention, these issues can be addressed by introducing signal switching circuitry which allows the individual transmitter signals to be isolated for analysis. This will allow testing of coupling between the transmitters, and, in those instances where coupling is not significant, allow for error vector magnitude (EVM) measurements for individual transmitted data packets from the individual transmitters. However, simply introducing switching circuitry will likely affect test time, since after capturing one or more data packets from one transmitter some delay will be introduced as the switches provide for transmission of the signal from another transmitter. Such delays may be significant, depending upon the production test environment.

Referring to FIGS. 5A and 5B, testing problems associated with such delays can be minimized or avoided by using one or both of the switching systems shown. (These examples provide for the switching among three transmitter inputs 501, 502, 503; however, it should be understood that these implementations can be extended to handle additional input signals.) This circuitry includes a power combiner 530 to combine the various input signals 501, 502, 503, received via respective signal switches 521, 522, 523, into a single signal 540 to be fed to the test equipment. Such signal switches 521, 522, 523 are well known in the art and have fast switching times, e.g., relative to the signal frequencies and data rates. Further, such signal switches 521, 522, 523 are preferably solid state switches, and can be implemented as multiple switches in series or parallel, as needed or desired, to provide the desired isolation between the transmitters (not shown) and the power combiner 530, as well as appropriate termination impedance so as to allow the power combiner 530 to sum the different input signals correctly.

Referring to FIG. 5A, this implementation includes signal power detectors 511, 512, 513 for detecting the power of the respective input signals 501, 502, 503, with detected power signals being provided to a control circuit 550, which provides control signals for the input signal switches 521, 522, 523. This allows the control circuit 550 to determine the presence of a signal (e.g., based upon the amount of power indicated by the power detection signal) at each of the input terminals. Based upon these power indication signals, as well as the known states (e.g., open or closed) of the switches 521, 522, 523, the control circuit 550 generates a trigger signal 560 (e.g., based upon a programmable state machine inside the control circuit 550) to control the capturing by the test equipment (not shown) of the data packets received in the output signal 540 of the power combiner 530, as discussed above.

Alternatively, a single detector can be used, e.g., the first signal power detector 511 for the first received signal 501. With all DUT transmitters operating simultaneously in a similar manner, detection by this single detector 511 of the arrival of the data packet in the first received signal 501 will also indicate the arrival of the data packets in the remaining received signals 502, 503.

Referring to FIG. 5B, according to an alternative implementation, a single power detector 514 is used, instead of multiple input power detectors 511, 512, 513, to detect the power of the output signal 540 of the power combiner 530. As before, the control circuitry 550 knows the states of the input switches 521, 522, 523 and can thereby determine which input signal 501, 502, 503 is providing the output signal 540 via the power combiner 530.

While differing in their respective implementations, both of these circuits of FIGS. 5A and 5B provide the ability to switch among the input signals 501, 502, 503 in a known sequence during the time intervals between the respective data packets of the signals being tested. Accordingly, switching can occur after every data packet, after multiple data packets or after the desired amount of data has been captured (e.g., after capturing the desired first 16 symbols of a 32-symbol packet), as desired.

Figure 6:
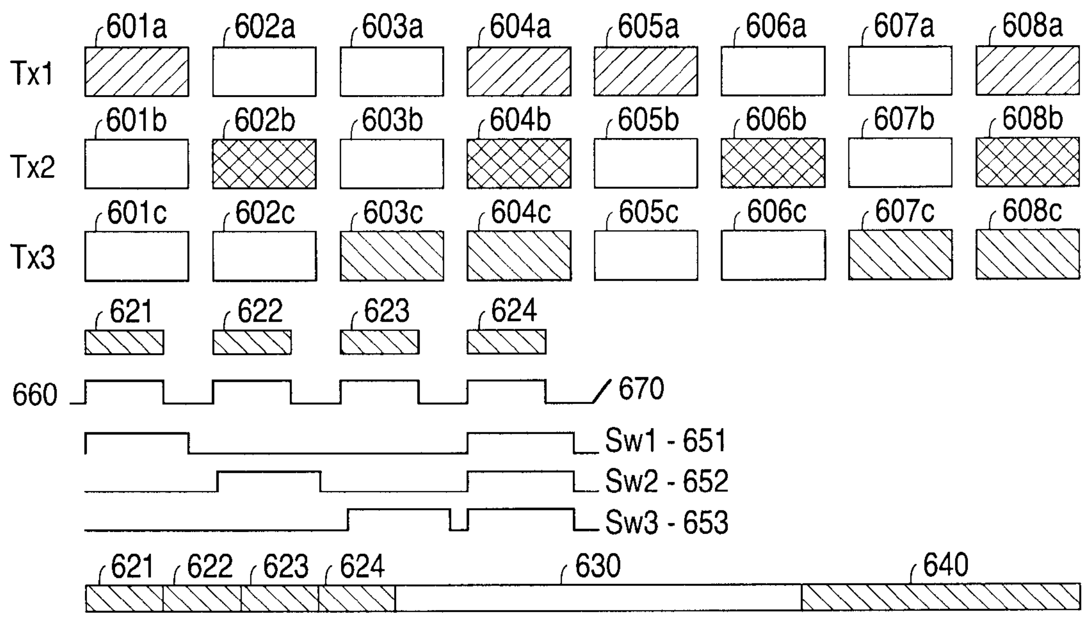
FIG. 6 is a diagram depicting a method of capturing data packets for analysis using the circuitry of FIGS. 5A and 5B.

Referring to FIG. 6, one possible method of operation of such a system includes the transmission of a stream of data packets 601-608, with each of the three transmitters transmitting a respective data stream 601*a*-608*a*, 601*b*-608*b*, 601*c*-608*c*. The control circuitry 550 (FIGS. 5A and 5B) selects the first transmitter output 601*a*, followed by the second transmitter output 602*b*, and the third transmitter output 603*c*. This is then followed by a selection of the outputs of all three transmitters 604*a*, 604*b*, 604*c* which are combined into a composite signal. Multiple triggering is used, as discussed above, to minimize the amount of data actually being captured, e.g., the data capture intervals 621, 622, 623, 624 need only be as long as necessary for capturing the desired amounts of each of the individual data packets 601*a*, 602*b*, 603*c*, and the sum of data packets 604*a*, 604*b*, 604*c*. As discussed above, this data is combined, e.g., packed in a sequence of captured data 621-624, transferred during transfer interval 630, and analyzed during analysis interval 640. The switch control signals 651, 652, 653 for the three signal switches 521, 522, 523 are also shown, as produced by the control circuit 550.

Alternatively, instead of the capturing of the data packet portions being controlled internally by the test instrument itself, the trigger signal 660 provided by the control circuit 550 can be used. This can be advantageous when multiple input signals are involved, such as when testing a MIMO system. This trigger signal 660 identifies the data packet capture intervals 621, 622, 623, 624 (e.g., where a high signal level corresponds to the data capture interval). The angled portion of the signal 670 at the end identifies an optional end of trigger sequence which allows the test instrument to terminate its capturing of data packets and initiate the data transfer, i.e., during the transfer interval 630. Alternatively, the data transfer interval 630 can be initiated following the capturing of the desired amount of data packets, e.g., four data packets as shown in this example.

As noted, controlling the triggering of data packet capturing with the control circuitry 550 can be advantageous. For example, when testing a MIMO system, the ordering of the data packets can be controlled, thereby ensuring that the first packet is from the first transmitter, the second packet is from the second transmitter, the third packet is from the third transmitter, and the last captured data is the combined signal from all transmitters. Controlling the data capturing with such a trigger signal should not introduce any problematic delays, since the receiver circuitry within the test equipment will typically use a high speed analog-to-digital converter having a pipeline design in which the delay (i.e., through the pipeline) is significantly longer than the time needed for an analog trigger signal to initiate the capturing of data. In the event that the trigger signal is derived in a digital manner, simple memory, or buffer, circuitry for storing the history of the signal can be used to ensure proper timing.

Figure 7:
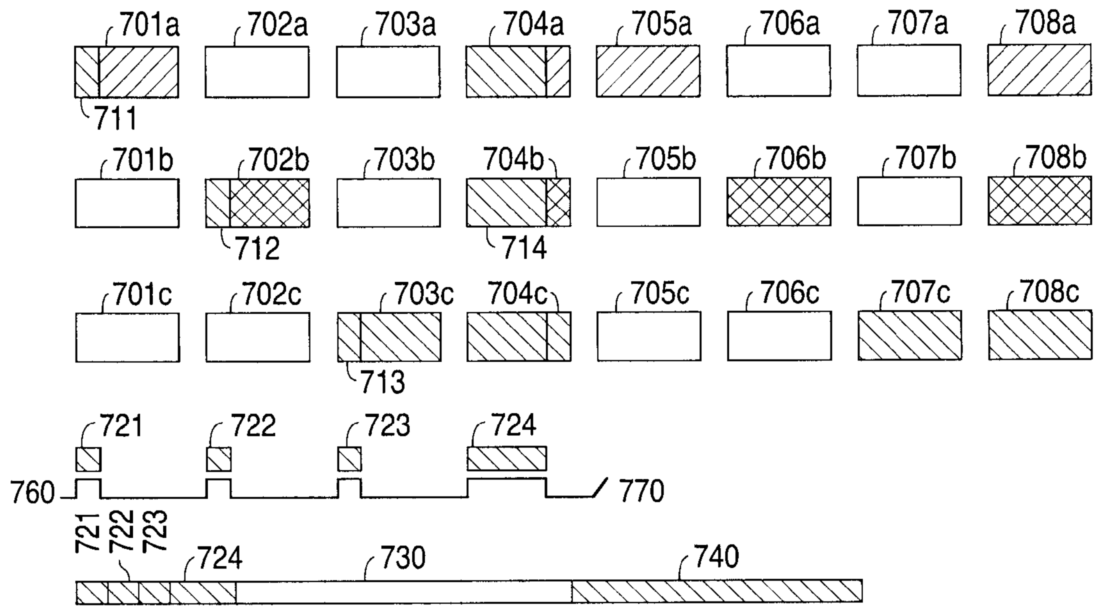
FIG. 7 is a diagram depicting another method for capturing data packets for analysis using the circuitry of FIGS. 5A and 5B.

Referring to FIG. 7, an alternative use of the control circuit 550 to generate the trigger 760 involves the capturing of small portions 711, 712, 713 of the respective data packets 701*a*, 702*b*, 703*c*, while still capturing a larger portion 714 of the combined data packets 704*a*, 704*b*, 704*c*. This would provide sufficient data capture to measure EVM of the first portions of the packets sent by the different transmitters, while maintaining the longer data packets to allow sufficient data capture in the case of the combined fourth data packets 704*a*, 704*b*, 704*c*, to allow for accurate spectral mask measurements. As a result, the captured data 721, 722, 723, 724, when packed for transferring during the transfer interval 730, is significantly shorter. Since the control circuitry 550 controls the different switches, it can be easily programmed to control the duration of the capture intervals such that the capturing of the portions 711, 712, 713 of the individual data packets 701*a*, 702*b*, 703*c* can be different, e.g., shorter, than the interval needed for capturing the portion 714 of the combined data packets 704*a*, 704*b*, 704*c*.

When testing a MIMO system, it may be necessary to use external hardware for synchronizing the duration of the data capture with the states of the respective switches (on and off), since the test equipment may not know when the appropriate packet type is being transmitted. However, it is also possible to introduce this type of synchronization within the test equipment when it is testing a signal transmitter. For example, it may be desirable to perform multiple power measurements for a IEEE 802.11a OFDM signal, followed by a spectral mask measurement. As discussed above, the power measurement may only need 6.4 microseconds, e.g., two consecutive 3.2-microsecond intervals beginning 8.8 microseconds after the beginning and ending 0.8 microsecond before the end of the 16-microsecond data packet preamble, while a spectral mask measurement may require a longer capture interval to provide reasonable power averaging. In any event, such timing synchronization can be implemented in any of many ways which are well known in the art.

As noted above in the discussion concerning the switching circuitry (FIGS. 5A and 5B), it can be difficult to test isolation between transmitters when testing composite signals. Such composite signal testing allows testing of power from individual transmitters, but the use of a signal combiner generally makes it difficult, if not impossible, to identify the origin of the power being measured. By adding switches to the input of the power combiner, it becomes possible to measure the coupling, so long as the isolation within the switches is better than the coupling level being tested.

Figure 8A:
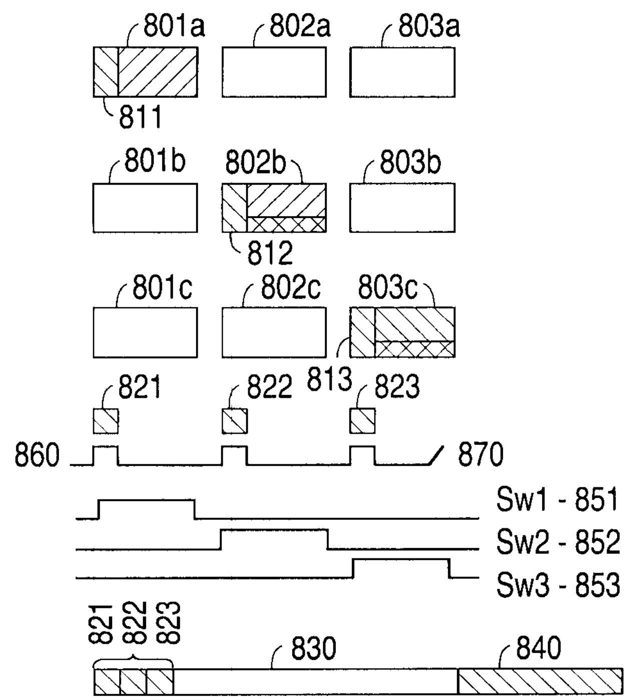
FIGS. 8A and 8B are diagrams depicting additional methods of capturing data packets for analysis using the circuitry of FIGS. 5A and 5B.

Referring to FIG. 8A, using a data packet testing technique as discussed above when testing a MIMO system can be described as follows: during transmission of the first data packet 801, the packet 801*a* from the first transmitter is conveyed to the power combiner 530 (FIGS. 5A and 5B). Similarly, during transmission of the second 802 and third 803 data packets, the data packets 802*b*, 803*c* from the second and third transmitters are conveyed to the power combiner 530. The appropriate switch settings are accomplished using the three switch control signals 851, 852, 853. Capturing of the desired portions 811, 812, 813 of the data packets 801*a*, 802*b*, 803*c* is done during time intervals 821, 822, 823 in accordance with the trigger control signal 860.

The data packet signal acquired during the first interval 821 contains power attributable only to the first transmitter. This capture interval is relatively short as the power coupling can be measured by composite measurement methods in the high throughput, long training sequence (HT-LTS) that appears at the beginning of the data packet. During the second capture interval 822, the captured signal includes primarily power from the second transmitter, but also some additional power due to coupling from the first transmitter data packet 802*a* into the second transmitter within the DUT. Using power analysis and composite measurement techniques (as discussed in Application No. 60/596,444, as noted above) the power attributed to the first transmitter data packet 802*a* can be determined. Similarly, following capture of the third data packet 803*c* during its data capture interval 823, power attributed to the first transmitter data packet 803*a* can also be determined. Further similarly, during the first data capture interval 821, power coupling attributed to the second transmitter data packet 801*b* and third transmitter data packet 801*c* can be determined, as well as power attributed to the first transmitter data packet 802*a* and third transmitter data packet 802*c* following the second data capture interval 822. Accordingly the transmitter power attributed to the transmitter of interest, as well as contributions from the other transmitters, can be determined.

Referring again to FIG. 7, it should now be understood that the desired information regarding the data signal transmission characteristics can be obtained during the first three data signal capture intervals 721, 722, 723, since the coupling between transmitters can be determined, and the last data capture interval 724 can be used to measure signal transmission quality and other parameters using the composite EVM techniques as described in Application No. 60/595,444, as noted above.

Figure 8B:
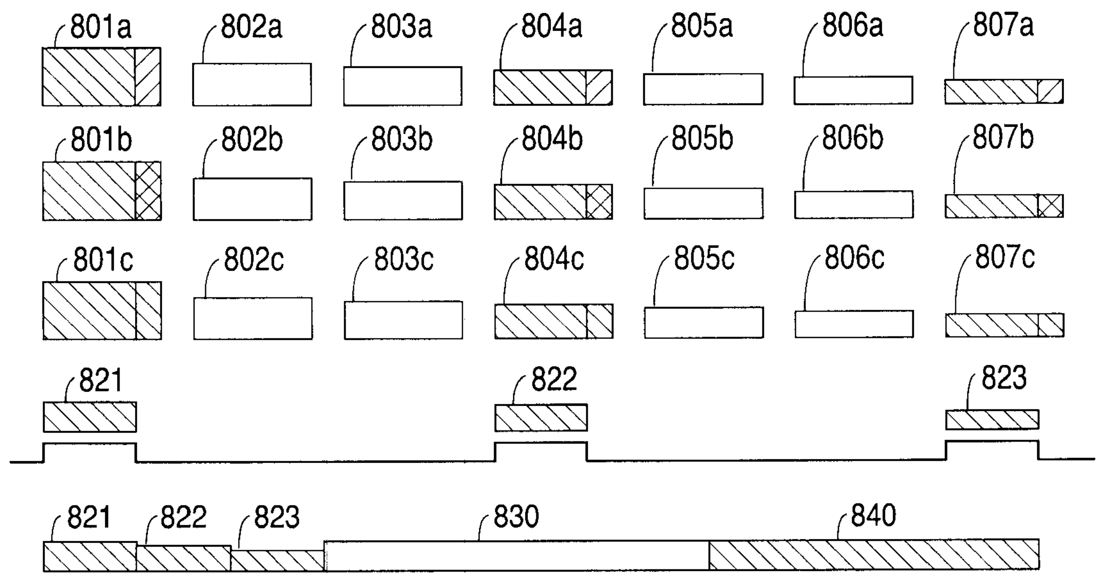

Referring to FIG. 8B, it should be further understood that, as an alternative, intermediate packets 802, 803, 805, 806 between the captured packets 801, 804, 807 can be skipped. For example, it may be necessary to allow the transmitter being tested to settle, e.g., in terms of frequency and power. This can be implemented by simply counting the number of packets that are measured before initiating capturing of data packets. This is particularly useful when testing multiple packets. For example, it may be desirable to transmit different power levels for purposes of calibration or other tests. If the transmitter requires some time for settling, a first number of packets can be transmitted at one power level, following which the power level is changed and a second number of packets are transmitted. In such cases, it may be desirable to transmit the majority of such number of packets prior to capturing one or more of such packets at the end before the power level changes for the next data packet transmission.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for selectively capturing at least respective portions of multiple data packets within a packet data signal for analysis, comprising:

receiving a packet data signal including a plurality of sequential non-contiguous data packets;

capturing, during a plurality of sequential non-contiguous capture intervals, a respective portion, at least, of each one of at least two of said plurality of sequential non-contiguous data packets to provide a plurality of captured data;

assembling said plurality of captured data to provide a plurality of substantially contiguous data; and conveying said plurality of substantially contiguous data for processing.

2. The method of claim 1, wherein said receiving a packet data signal including a plurality of sequential non-contiguous data packets comprises receiving a wireless packet data signal.

3. The method of claim 1, wherein said capturing, during a plurality of sequential non-contiguous capture intervals, a respective portion, at least, of each one of at least two of said plurality of sequential non-contiguous data packets to provide a plurality of captured data comprises sampling said packet data signal.

4. The method of claim 3, wherein said sampling said packet data signal comprises sampling said packet data signal in response to an at least partially periodic trigger signal.

5. The method of claim 1, wherein said capturing, during a plurality of sequential non-contiguous capture intervals, a respective portion, at least, of each one of at least two of said plurality of sequential non-contiguous data packets to provide a plurality of captured data comprises capturing a plurality of non-consecutive ones of said plurality of sequential non-contiguous data packets.

6. The method of claim 1, wherein said assembling said plurality of captured data to provide a plurality of substantially contiguous data comprises storing said plurality of captured data for subsequent access in a substantially contiguous manner.

7. The method of claim 1, wherein said conveying said plurality of substantially contiguous data for processing comprises transferring said plurality of substantially contiguous data to remote processing circuitry.

8. The method of claim 1, further comprising generating a plurality of gap data substantially unrelated to said packet data signal, and wherein said assembling said plurality of captured data to provide a plurality of substantially contiguous data comprises assembling, in an alternating manner, portions of said plurality of gap data with portions of said plurality of captured data to provide said plurality of substantially contiguous data.

9. The method of claim 1, wherein said assembling said plurality of captured data to provide a plurality of substantially contiguous data comprises encoding at least a portion of said plurality of captured data prior to said assembling of said plurality of captured data to provide said plurality of substantially contiguous data.

10. A method for selectively capturing at least respective portions of multiple data packets within a packet data signal for analysis, comprising:

receiving, during a first time interval, a packet data signal including a plurality of sequential data packets separated by respective time intervals;

capturing, during a plurality of sequential non-contiguous portions of a second time interval, a respective portion, at least, of each one of at least two of said plurality of sequential data packets to provide a plurality of captured data;

assembling, during a third time interval which is shorter than said second time interval, said plurality of captured data to provide a plurality of substantially contiguous data; and conveying, during a fourth time interval, said plurality of substantially contiguous data for processing.

11. The method of claim 10, wherein said receiving, during a first time interval, a packet data signal including a plurality of sequential data packets separated by respective time intervals comprises receiving a wireless packet data signal.

12. The method of claim 10, wherein said capturing, during a plurality of sequential non-contiguous portions of a second time interval, a respective portion, at least, of each one of at least two of said plurality of sequential data packets to provide a plurality of captured data comprises sampling said packet data signal.

13. The method of claim 12, wherein said sampling said packet data signal comprises sampling said packet data signal in response to an at least partially periodic trigger signal.

14. The method of claim 10, wherein said capturing, during a plurality of sequential non-contiguous portions of a second time interval, a respective portion, at least, of each one of at least two of said plurality of sequential data packets to provide a plurality of captured data comprises capturing a plurality of non-consecutive ones of said plurality of sequential non-contiguous data packets.

15. The method of claim 10, wherein said assembling, during a third time interval which is shorter than said second time interval, said plurality of captured data to provide a plurality of substantially contiguous data comprises storing said plurality of captured data for subsequent access in a substantially contiguous manner.

16. The method of claim 10, wherein said conveying, during a fourth time interval, said plurality of substantially contiguous data for processing comprises transferring said plurality of substantially contiguous data to remote processing circuitry.

17. The method of claim 10, further comprising generating a plurality of gap data substantially unrelated to said packet data signal, and wherein said assembling, during a third time interval which is shorter than said second time interval, said plurality of captured data to provide a plurality of substantially contiguous data comprises assembling, in an alternating manner, portions of said plurality of gap data with portions of said plurality of captured data to provide said plurality of substantially contiguous data.

18. The method of claim 10, wherein said assembling, during a third time interval which is shorter than said second time interval, said plurality of captured data to provide a plurality of substantially contiguous data comprises encoding at least a portion of said plurality of captured data prior to said assembling of said plurality of captured data to provide said plurality of substantially contiguous data.

* * * * *